(12) United States Patent
Bienas et al.

(10) Patent No.: US 8,406,228 B2
(45) Date of Patent: Mar. 26, 2013

(54) MESSAGE GENERATING ARRANGEMENT

(75) Inventors: Maik Bienas, Braunschweig (DE);
Sabine van Niekerk, Unterhaching (DE); Norbert Schwagmann, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 469 days.

(21) Appl. No.: 11/765,849

(22) Filed: Jun. 20, 2007

(65) Prior Publication Data

US 2007/0293251 A1 Dec. 20, 2007

Related U.S. Application Data

(60) Provisional application No. 60/815,228, filed on Jun. 20, 2006.

(51) Int. Cl.
*H04L 12/28* (2006.01)
(52) U.S. Cl. .......................... 370/389; 370/352; 370/329
(58) Field of Classification Search .................. 370/352, 370/329, 389
See application file for complete search history.

(56) References Cited

U.S. PATENT DOCUMENTS

| 6,122,263 | A * | 9/2000 | Dahlin et al. | 370/329 |
|---|---|---|---|---|
| 6,567,667 | B1 * | 5/2003 | Gupta et al. | 455/445 |
| 7,359,373 | B2 * | 4/2008 | Kuusinen et al. | 370/352 |
| 2002/0065086 | A1 * | 5/2002 | Vanttinen et al. | 455/456 |
| 2003/0026245 | A1 | 2/2003 | Ejzak | |
| 2004/0190498 | A1 | 9/2004 | Kallio et al. | |
| 2006/0268904 | A1 * | 11/2006 | Bae et al. | 370/401 |
| 2007/0297390 | A1 * | 12/2007 | Skog et al. | 370/352 |

FOREIGN PATENT DOCUMENTS

| DE | 199 43 742 A1 | 3/2001 |
|---|---|---|
| DE | 103 45 017 A1 | 4/2005 |
| DE | 10 2004 029 686 A1 | 1/2006 |
| EP | 1 161 104 A1 | 12/2001 |
| WO | WO-2006/034658 A1 | 4/2004 |
| WO | WO2006/052176 * | 5/2006 |

OTHER PUBLICATIONS

CSI network/release 7 by samsung.*
3GPP TS 23.279 V7.2.0 (Mar. 2006); *Technical Specification*; 3rd Generation Partnership Project; Technical Specification Group Services and System Aspects; Combining Circuit Switched (CS) and IP Multimedia Subsystem (IMS) services; Stage 2 (Release 7).
3GPP TR 24.879 V7.0.0 (Mar. 2006); *Technical Report*; $3^{rd}$ Generation Partnership Project; Technical Specification Group Core Network and Terminals; Combining CSs calls and IMS sessions; Stage 3 (Release 7).
3GPP TS 23.206 V0.4.0. (Apr. 2006); *Technical Specification*; 3rd Generation Partnership Project; Technical Specification Group Services and System Aspects; Voice Call Continuity between CS and IMS; Stage 2 (Release 7).
3GPP TR 23.806 V7.0.0 (Dec. 2005); *Technical Report*; 3rd Generation Partnership Project; Technical Specification Group Services and System Aspects; Voice Call Continuity between CS and IMS Study (Release 7). 3GPP *draft* TR 23.819 V0.12.0 (Mar. 2006); *Technical Report*; 3rd Generation Partnership Project; Technical Specification Group Services and System Aspects; Study on handling the termination of real-time sessions and calls (Release 7).

* cited by examiner

*Primary Examiner* — Dang Ton
*Assistant Examiner* — Pamit Kaur
(74) *Attorney, Agent, or Firm* — Schiff Hardin LLP

(57) ABSTRACT

A message generating arrangement determines whether a first communication terminal of a communication system can participate, by means of packet-switching network elements of the communication system, in a communication link in which a second communication terminal of the communication system is participating by means of circuit-switching network elements of the communication system, and generates a message on the basis of the result of the determination.

16 Claims, 12 Drawing Sheets

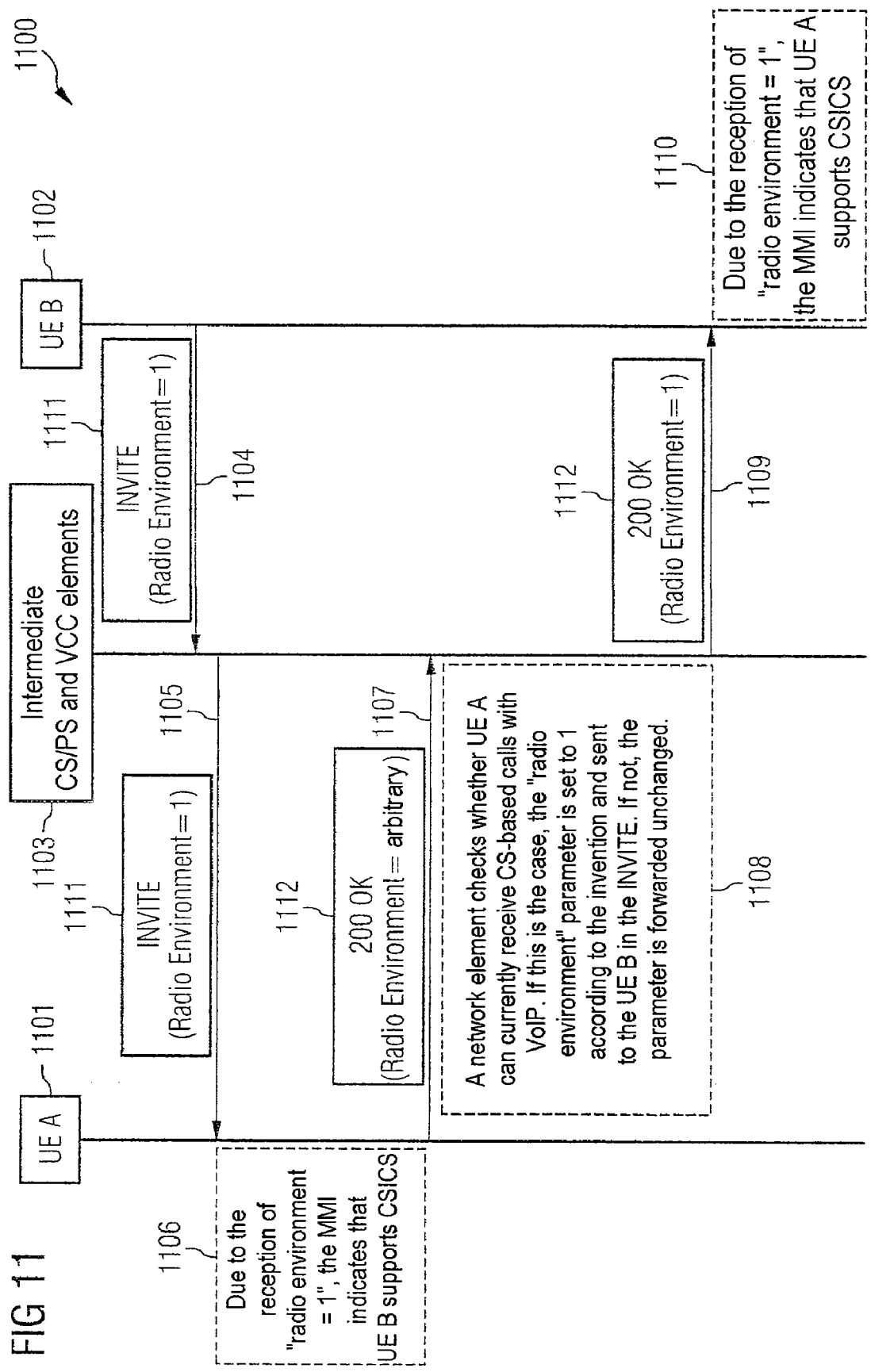

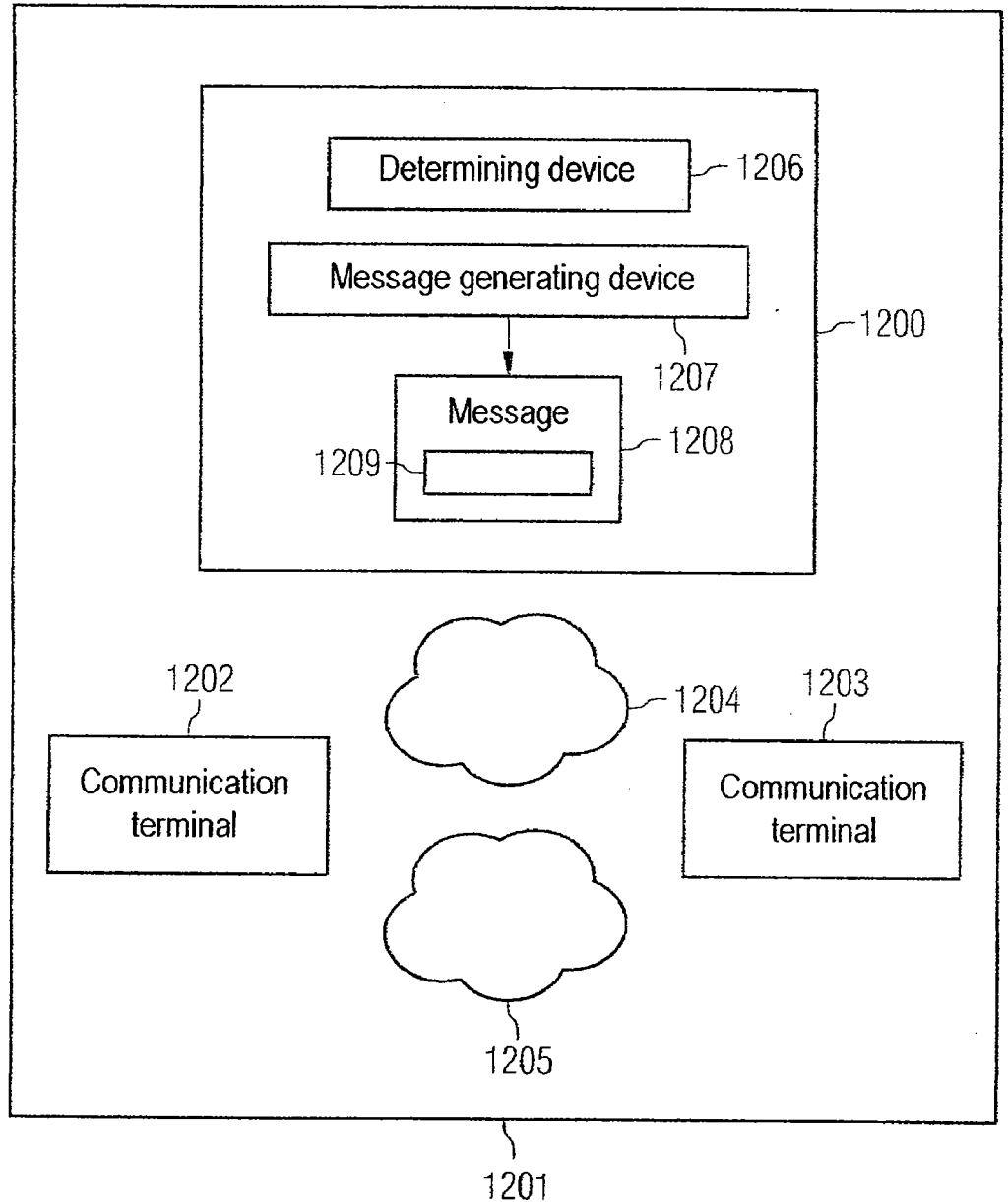

MESSAGE GENERATING ARRANGEMENT

CROSS-REFERENCE TO RELATED APPLICATION

This application claims priority to Provisional Patent Application Ser. No. 60/815,228, which was filed Jun. 20, 2006, and is incorporated herein by reference in its entirety.

FIELD OF THE INVENTION

The invention relates to a message generating arrangement and to a method for generating a message.

BACKGROUND OF THE INVENTION

It would be desirable to create a possibility of being able to set up a circuit-switched communication link and a packet-switched communication link in parallel from one mobile radio user terminal to another mobile radio user terminal even if the other mobile radio user terminal can only use communication links by means of the packet-switching domain of a mobile radio network and not by means of the circuit-switching domain of the mobile radio network.

BRIEF DESCRIPTION OF THE INVENTION

According to an illustrative embodiment of the invention, a message generating arrangement of a communication system is provided which has a determining device which determines whether a first communication terminal of the communication system can participate, by means of packet-switching network elements of the communication system, in a communication link in which a second communication terminal of the communication system is participating by means of circuit-switching network elements of the communication system, and a message generating device which, when it has been determined that the first communication terminal can participate, by means of the packet-switching network elements, in a communication link in which the second communication terminal is participating by means of the circuit-switching network elements, generates a message which has the information that the first communication terminal supports that a packet-switched communication link and a circuit-switched communication link can exist simultaneously between the first communication terminal and the second communication terminal.

BRIEF DESCRIPTION OF THE FIGURES

Illustrative embodiments of the invention are shown in the figures and will be explained in greater detail in the text which follows.

FIG. 11 shows a message flowchart according to an illustrative embodiment of the invention.

FIG. 12 shows a message generating arrangement according to an illustrative embodiment of the invention.

DETAILED DESCRIPTION

Figure 1:
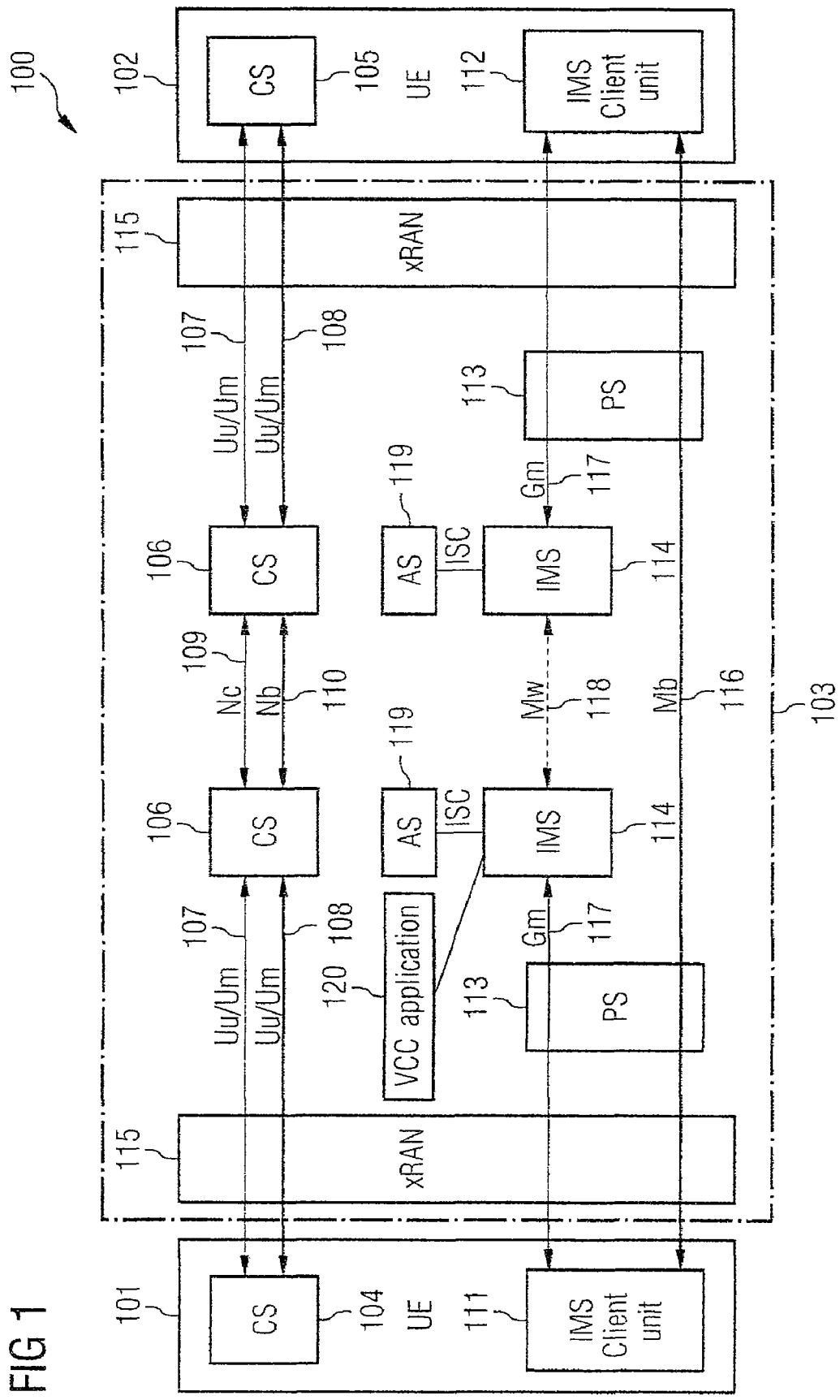
FIG. 1 shows a mobile radio communication system according to an illustrative embodiment of the invention.

In Europe, work is currently being carried out for developing and standardizing third-generation mobile radio systems. For example, the "Universal Mobile Telecommunications System" (UMTS), which is being developed as part of the 3rd Generation Partnership Project (3GPP), is of great significance.

As part of 3GPP, work is currently being carried out on the work item "Combining CS calls and IMS sessions" (CSI). CSI is intended to enable two users of a mobile radio communication system to use a circuit-switched telecommunication link and a packet-switched communication link in parallel to send each other data. A circuit-switched telecommunication link is also called CS call and is provided by means of the CS (circuit switched) domain of the mobile radio communication system.

A packet-switched communication link provided as part of CSI is an IMS (Internet Protocol Multimedia Sub-System) session which is provided by means of the PS (Packet-Switched) domain of the mobile radio communication system. The signalling for the packet-switched communication link or, respectively, for the communication service provided by means of the packet-switched communication link is carried out by means of the IMS of the mobile radio communication system which can be considered to be an extension of the PS core network. The protocol used in the IMS for transmitting signalling data is the Session Initiation Protocol (SIP).

In the text which follows, an example of using CSI is explained. A user of a mobile radio communication system has just purchased a new car and is calling a friend who is also a user of the mobile radio communication system, that is to say establishes a circuit-switched (mobile radio) telecommunication link between himself and his friend or, respectively, between the mobile radio user terminals used in each case. It is assumed that the mobile radio user terminal used by the user and the mobile radio user terminal used by his friend support CSI. The user is shown on a display of his mobile radio user terminal that the mobile radio user terminal used by his friend supports CSI. The user then uses an IMS session for sending a digital photo of the car to his friend which he has taken, for example, by means of a digital camera integrated in his mobile radio user terminal.

It is intended that the user is enabled to use an IMS session, for sending a photo in the present example, in the context of the circuit-switched telecommunication link. In particular, it should not be required that the user changes into a particular application on his mobile radio user terminal during the telephone call or selects his friend in a telephone directory as participant in the IMS session.

The possibility of a circuit-switched telecommunication link and a packet-switched communications link existing simultaneously between two mobile radio user terminals exists in UMTS mobile radio communication systems and also in the older GSM (Global System for Mobile Communications) or EDGE (Enhanced Data Rates for GSM Evolution) mobile radio communication systems. This is called Dual Transfer Mode (DTM) Capability in the radio access network of a GSM or EDGE mobile radio communication system, i.e. a GSM or EDGE Radio Access Network (GERAN). In the radio access network of a UMTS mobile radio communication system, i.e. a UMTS Terrestrial Radio Access Network (UTRAN), it is called Multi Radio Access Bearer (MultiRAB) Capability.

In CSI, in addition to the technical capability of providing both a circuit-switched telecommunication link and a packet-switched communication link between two users, the two users are to be informed about the capability of simultaneous provision of a packet-switched communication service combined with the circuit-switched telecommunication link when they are talking to one another by means of a circuit-switched telecommunications link.

Furthermore, the circuit-switched telecommunication link and the IMS session are to be represented in a single context when the two users are utilizing this capability and an IMS session exists in parallel with, in other words simultaneously with, a circuit-switched telecommunications link.

The following procedures are specified for this purpose as part of the CSI work item:

"Radio Capability Exchange": two mobile radio user terminals exchange whether they are (currently) supporting CSI. To support CSI, each mobile radio user terminal must have the DTM Capability or the Multi RAB Capability and the current radio engineering situation at the locations at which the mobile radio user terminals are located must provide for parallel utilization of a circuit-switched telecommunication link and a packet-switched communication link. In the case where a circuit-switched telecommunication link exists between the two mobile radio user terminals and there is no packet-switched communication link between the two mobile radio user terminals as yet, this exchange takes place by means of the CS domain of the mobile radio communication system.

"SIP-based UE Terminal Capability Exchange": two mobile radio user terminals exchange information about which communication services (with which parameters), which are provided by means of the PS domain of the mobile radio communication system, they support. This information is exchanged by means of the signalling of the PS domain and can take place at any time, that is to say also before a circuit-switched telecommunication link or an IMS session is set up between the two mobile radio user terminals.

"MSISDN Number Exchange in SIP": two mobile radio user terminals exchange the telephone numbers of the respective users by means of the IMS signalling.

"Establishing Parallel Connections":
first case: establishing an IMS session between two mobile radio user terminals in parallel with a circuit-switched telecommunication link already existing between the two mobile radio user terminals;
second case: setting-up a circuit-switched telecommunication link between two mobile radio user terminals in parallel with an IMS session already existing between the two mobile radio user terminals.

The example described above, in which a user sends a photo to another user by means of an IMS session in parallel with a circuit-switched telecommunication link is an application of the above-mentioned Establishing Parallel Connections procedure.

As part of the 3GPP, a work item by the name of "Voice Call Continuity Between CS and IMS" (VCC) is also currently being discussed. The VCC functionality is intended to make it possible that a voice communication link exists between a first user who is participating in the voice communication link by means of the CS (circuit switched) domain, and a second user who is participating in the voice communication link by means of the PS (packet switched) domain.

For example, it is intended to set up a voice communication link, initiated by the first user by means of units of the CS domain, to the second user by means of units of the PS domain. For example, it should be possible to perform a handover from the CS domain into the PS domain or conversely without interruption for an existing voice communication link. That is to say, for example, the second user first participates in the voice communication link by means of the CS domain and participates in the communication link by means of the PS domain after the handover, or conversely.

If a communication link is to a mobile radio user terminal for which VCC is supported is established, the setting-up of the communication link is signalled to a special control unit which, for example, is called VCC application in a UMTS communication system. This control unit decides the domain by means of which the mobile radio user terminal is participating in the communication link, in other words, by means of which domain, the PS domain or the CS domain, the communication link is provided for the mobile radio user terminal. This decision is made in dependence on the domains in which the mobile radio user terminal is currently registered and which domain should preferably be used according to a determination of the user of the mobile radio user terminal or also of the operator of the corresponding mobile radio network.

If there is a communication link between two mobile radio user terminals in which one of the two mobile radio user terminals is participating by means of the CS domain and the other mobile radio user terminal is participating by means of the PS domain, the communication data which are transmitted between the two mobile radio user terminals are converted. If a user initiates a communication link to a mobile radio user terminal for which VCC is supported, it is not signalled to the user (or the mobile radio user terminal used by him) by means of which domain the mobile radio user terminal is participating in the communication link.

In the text which follows, an example of the utilization of the functionality provided according to VCC will be explained. A user of a mobile radio user terminal is at home. He operates his own WLAN (wireless local area network) at home and utilizes a communication link to a mobile radio network by means of a DSL (Digital Subscriber Line) communication link and a WLAN communication link between his mobile radio user terminal and his DSL modem.

Using the communication link to the mobile radio network, the user can utilize, for example, a VoIP communication service and conduct a telephone conversation with another user. The other user participates in the telephone conversation by means of the mobile radio network and the communication data sent out by the user are forwarded to the other user by means of the mobile radio network.

The user of the mobile radio user terminal can also accept telephone calls by means of his WLAN, that is to say participate in communication links which were initiated by means of units of the CS domain. For this purpose, the caller can simply dial the telephone number of the user (that is to say the directory number of the mobile radio user terminal) and a VCC unit, for example a VCC application, ensures that the call is forwarded to the mobile radio user terminal by means of the PS domain, in the present case by means of the DSL communication link, and, if the user accepts the call, a voice communication link is set up in which the user participates by means of units of the PS domain and the caller participates by means of units of the CS domain.

If the user leaves his home and the coverage area of his WLAN, a handover of the voice communication link, is carried out, for example to the mobile radio network, so that the user subsequently participates in the voice communication link by means of the air interface of the mobile radio network and units of the CS domain of the mobile radio network.

As part of the "CSI Interworking" work item, functionalities will be discussed which relate to the linkage of a number of communication services with CSI.

According to an illustrative embodiment of the invention, a message generating arrangement of a communication system is provided which has a determining device which determines whether a first communication terminal of the communication system can participate, by means of packet-switching network elements of the communication system, in a communication link in which a second communication terminal of the communication system is participating by means of circuit-switching network elements of the communication system, and a message generating device which, when it has been determined that the first communication terminal can participate, by means of the packet-switching network elements, in a communication link in which the second communication terminal is participating by means of the circuit-switching network elements, generates a message which has the information that the first communication terminal supports that a packet-switched communication link and a circuit-switched communication link can exist simultaneously between the first communication terminal and the second communication terminal.

According to a further illustrative embodiment of the invention, a method for generating a message according to the message generating arrangement described is provided.

As used herein a device may be a (part of a) hardware circuit, e.g. a (part of a) integrated circuit, designed for the respective functionality or also a programmed unit, such as a processor, programmed for the respective functionality. Various devices may be implemented by the same processor when it is programmed according to the functionality of the devices.

The further embodiments of the invention which are described in conjunction with the message generating arrangement correspondingly also apply to the method for generating a message.

To illustrate, according to an illustrative embodiment of the invention, a message is generated by means of which it is possible to signal that a circuit-switched communication link and a packet-switched communication link can exist in parallel between the first communication terminal and the second communication terminal, also in the case where the first communication terminal can only use communication links by means of the PS domain.

Since, for example, it is provided in conventional mobile radio communication systems that a mobile radio user terminal only signals that it currently supports CSI if it has the DTM capability or, respectively, the multi RAB capability and the current radio engineering situation at the location at which the mobile radio user terminal is located provides for parallel utilization of a circuit-switched telecommunication link and a packet-switched communication link, the use of the message generating arrangement according to the illustrative embodiment of the invention described above has the advantage that CSI can be utilized even if one of the two mobile radio user terminals involved can only participate in communication links by means of the PS domain.

The illustrative embodiment of the invention described above thus makes it possible, for example, that, if VCC is supported for a mobile radio user terminal, the mobile radio user terminal uses CSI even though it can only use communication links by means of the PS domain and not by means of the CS domain.

According to an illustrative embodiment of the invention, a mobile radio user terminal for which VCC is supported and which correspondingly can also utilize CSI, signals that it can utilize CSI, that is to say that a further mobile radio user terminal can set up a circuit-switched communication link and a packet-switched communication link to the mobile radio user terminal in parallel.

The communication system can be configured according to the 3GPP standard. In one illustrative embodiment, the communication system can also be another communication system by means of which CS-domain-based and PS-domain-based communication services can be provided. These communication services can be provided by the first communication terminal, for example by means of a communication network according to DECT (Digital Enhanced Cordless Telecommunications), xDSL (DSL: Digital Subscriber Line), for example ADSL (Asynchronous DSL), ADSL2+, VDSL (Very High Data Rate DSL), SDSL (Symmetrical DSL), or according to WLAN (Wireless Local Area Network), WiMAX (Worldwide Interoperability for Microwave Access), GSM (Global System for Mobile Communications) or UMTS.

In the message generating arrangement according to an illustrative embodiment of the invention, the signalling device is arranged in the first communication terminal.

The communication system can have a communication network and the signalling device can be a unit of the communication network.

In one illustrative embodiment of the invention, the message is generated as part of a protocol conversion from a signalling protocol which is used by the packet-switching network elements, to a signalling protocol which is used by the circuit-switching network elements.

The signalling protocol used by the packet-switching network elements is, for example, the SIP (Session Initiation Protocol). The signalling protocol used by the circuit-switching network elements is, for example, SS7 (Signalling System Number 7).

In an illustrative embodiment of the invention, the communication network is a mobile radio communication network. The first communication terminal can be correspondingly a mobile radio user terminal. The communication system can also be a landline network or have a landline network, for example a landline network according to NGN (Next Generation Network).

The message generating device can be set up for generating the message when the first communication terminal is registered with a network element of the communication system for utilizing packet-switched communication links.

The determining device is set up, for example, for determining whether VCC is supported for the first communication terminal.

In an illustrative embodiment of the invention, the message has the information that the first communication terminal supports CSI.

FIG. 1 shows a mobile radio communication system 100 according to an illustrative embodiment of the invention.

The mobile radio communication system 100 has a first mobile radio user terminal 101 and a second mobile radio user terminal 102. The mobile radio communication system 100 is arranged, for example, according to the UMTS (Universal Mobile Telecommunications System) Standard or according to the GSM (Global System for Mobile Communications)-EDGE (Enhanced Data Rates for GSM Evolution) Standard. The mobile radio communication system 100 can also be arranged according to CDMA2000 or FOMA (Freedom of Mobile Multimedia Access).

In the present illustrative embodiment, it is assumed that the mobile radio communication system 100 is arranged according to the UMTS Standard. Correspondingly, the mobile radio user terminals 101, 102 are also called User Equipment (UEs).

The first mobile radio user terminal 101 and the second mobile radio user terminal 102 are set up for communicating with one another, that is to say exchanging data, by means of a mobile radio communication network 103. The first mobile radio user terminal 101 has a first CS client unit 104. The second mobile radio user terminal 102 has a second CS client unit 105. The CS client units 104, 105 are used for utilizing circuit-switched telecommunication links which can be provided by the CS (Circuit Switched) core network 106 (CS Core) of the mobile radio communication network.

To utilize a circuit-switched communication link between the first mobile radio user terminal 101 and the second mobile radio user terminal 102, the CS client units 104, 105 communicate by means of the radio access network (RAN) 115 with the CS core network 106. The communication of signalling data between the CS client units 104, 105 and the CS core network 106 is indicated by the arrows 107. The communication of user data between the CS client units 104, 105 and the CS core network 106 is indicated by the arrows 108. The communication of signalling data within the CS core network 106 is indicated by the arrow 109 and the communication of user data within the CS core network 106 is indicated by the arrow 110.

The CS client units 104, 105 and the CS core network 106 are a part of the CS domain of the mobile radio communication system 100. By means of the CS core network 106, the user of the first mobile radio user terminal 101 and the user of the second mobile radio user terminal 102 can utilize, for example, a voice communication link, that is to say they can telephone, or also utilize a video communication link.

To utilize packet-switched communication services, the first mobile radio user terminal 101 has a first IMS (Internet Protocol Multimedia Subsystem) client unit 111 and the second mobile radio user terminal 102 has a second IMS client unit 112.

Packet-switched communication services are provided by means of the PS (Packet Switched) core network 113 (PS Core) and the IMS core network 114 (IMS Core). The IMS client units 111, 112, the PS core network 113 and the IMS core network 114 are a part of the PS domain of the mobile radio communication system 100.

If data transmission is enabled between the first mobile radio user terminal 101 and the second mobile radio user terminal 102 as part of a packet-switched communication service, the user data are communicated by means of the radio access network 115 and by means of the PS core network 113 as is indicated by the arrow 116. Signalling data, in contrast, are communicated by means of the radio access network 115, the PS core network 113 and by means of the IMS core network 114 as is indicated by the arrows 117. The communication of signalling data within the IMS core network is indicated by the arrow 118.

The IMS core network 114 can be coupled to one or more application server units 119. For example, an application server unit 119 performs the billing in packet-switched communication services which are provided by means of the IMS core network 114, or other application-specific functions. An application server unit 119 can also be a CSI application server unit (CSI-AS). The CSI application server unit knows, for example, the registration status of the first mobile radio user terminal 101 in the IMS core network 114 or in the CS core network 106 and it can decide about the forwarding of media streams which are sent out by the mobile radio user terminal 101 or are to be sent to the mobile radio user terminal 101, into the CS domain or the PS domain of the mobile radio communication system 100.

In the present illustrative embodiment, VCC is supported for the first mobile radio user terminal 101. A VCC application server unit 120 is provided for this purpose. If the second mobile radio user terminal 102 initiates, for example, a voice communication link to the first mobile radio user terminal 101, that is to say requests the setting-up of a voice communication link to the first mobile radio user terminal 101, this request is conveyed to the VCC application server unit 120. The VCC application server unit decides whether the voice communication link is forwarded to the first mobile radio user terminal 101 by means of the PS domain or by means of the CS domain, that is to say whether the voice communication link is set up in such a manner that the first mobile radio user terminal participates in the voice communication link by means of units of the PS domain or in such a manner that the first mobile radio user terminal participates in the voice communication link by means of units of the CS domain.

The VCC application server unit 120 can make this decision, for example, on the basis of preferences of the user of the first mobile radio user terminal 101 or of the network operator of the home network of the user of the first mobile radio user terminal 101. The home network of the user of the first mobile radio user terminal 101 is the part-network of the mobile radio communication network 103 in which the user of the first mobile radio user terminal 101 has subscribed. The decision of the VCC application server unit 120 is also made on the basis of whether there is a possibility that the mobile radio user terminal 101 uses communication links by means of the PS domain or the CS domain.

The VCC application server unit 102 makes it possible that a voice communication link can be set up to the first mobile radio user terminal 101 when there is a possibility that the mobile radio user terminal 101 uses communication links by means of the PS domain or of the CS domain. For example, a voice communication link can be set from the second mobile radio user terminal 102 to the first mobile radio user terminal 101 even when the second mobile radio user terminal 102 wishes to participate in the voice communication link by means of the CS domain and the first mobile radio user terminal can only participate in communication links by means of the PS domain.

Since VCC is supported for the first mobile radio user terminal 101, the first mobile radio user terminal 101 also supports CSI, that is to say, for example, a packet-switched communication link can be set up between the first mobile radio user terminal 101 and the second mobile radio user terminal 102 in parallel with a communication link between the first mobile radio user terminal 101 and the second mobile radio user terminal 102 in which the first mobile radio user terminal 101 is participating by means of the PS domain of the mobile radio network 103 and the second mobile radio user terminal 102 is participating by means of the CS domain of the mobile radio network 103.

For example, a packet-switched communication link can be set up between the first mobile radio user terminal 101 and the second mobile radio user terminal 102 in addition to a voice communication link or a video communication link which was initiated by the second mobile radio user terminal 102 and in which the first mobile radio user terminal 101 is participating by means of the PS domain of the mobile radio network 103, so that the utilization of packet-switched communication services between the first mobile radio user terminal 101 and the second mobile radio user terminal 102 is made possible, for example the communication of files, for example digital images between the first mobile radio user terminal 101 and the second mobile radio user terminal 102.

In the text which follows, a sequence is described according to which the first mobile radio user terminal 101, in one embodiment, determines whether it supports CSI.

Figure 2:
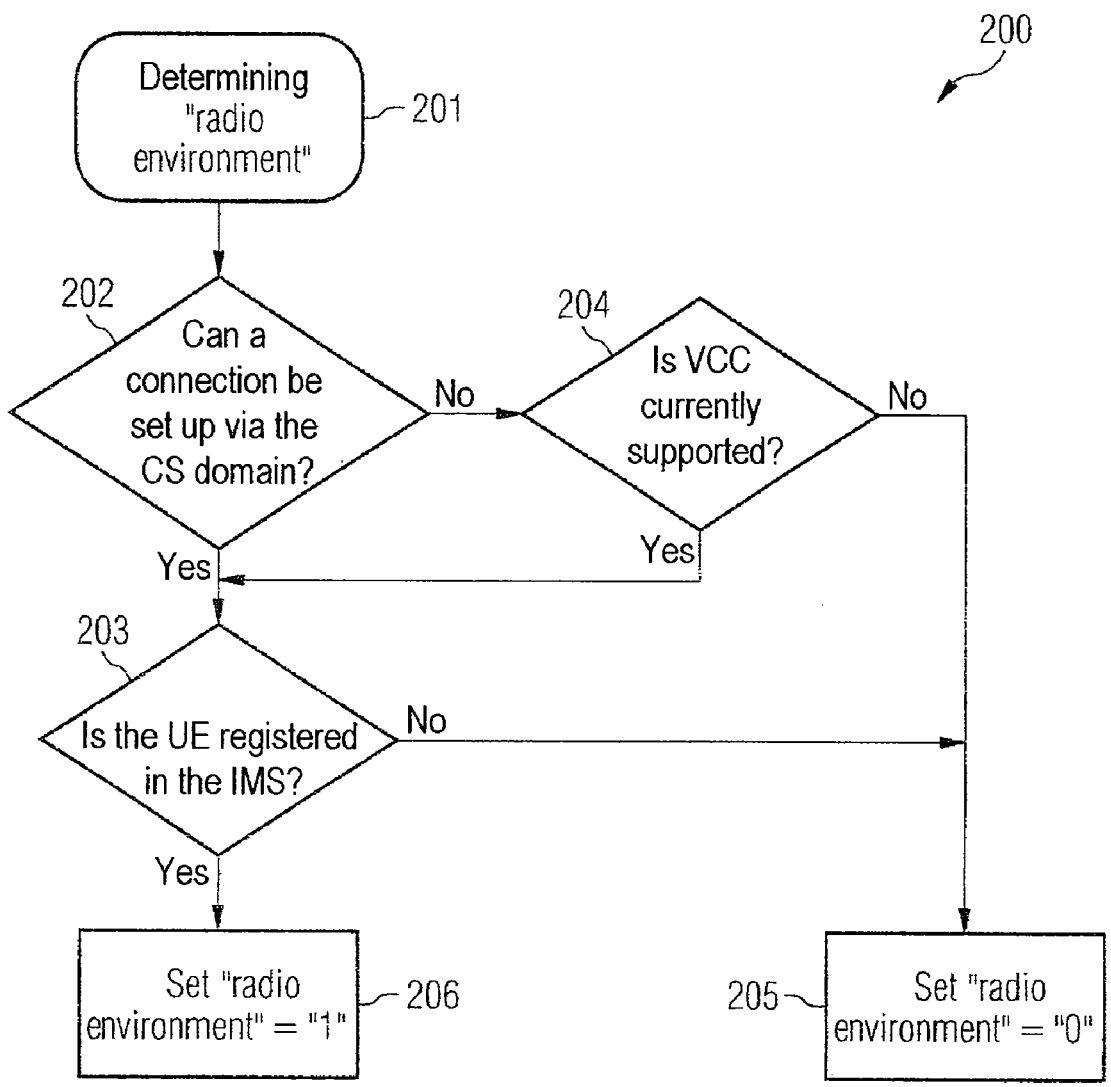
FIG. 2 shows a flowchart according to an illustrative embodiment of the invention.

FIG. 2 shows a flowchart 200 according to an illustrative embodiment of the invention.

The sequence shown in FIG. 2 is carried out by the first mobile radio user terminal 101, for example by a control device which is provided in the first mobile radio user terminal 101 and, for example, is implemented by means of a microprocessor of the first mobile radio user terminal 101.

The sequence is used for the first mobile radio user terminal 101 to determine whether it supports CSI. The information about whether the first mobile radio user terminal 101 supports CSI is signalled by the value of a parameter called radio environment. If the first mobile radio user terminal 101 supports CSI, the radio environment parameter is set to one and if the first mobile radio user terminal 101 does not support CSI, the radio environment parameter is set to zero.

The procedure for determining the value of the radio environment parameter begins in 201.

In 202, it is checked whether the first mobile radio user terminal 201 can set up a communication link by means of the CS domain of the mobile radio network 103 and can thus utilize a communication link by means of the CS domain of the mobile radio network 103. If the result of the check is positive, that is to say the first mobile radio user terminal 101 can set up or utilize a communication link by means of the CS domain of the mobile radio network 103, the sequence continues in 203. If the result of the check is negative, it continues in 204.

In 204, a check is made whether VCC is supported for the first mobile radio user terminal 101. If VCC is supported for the first mobile radio user terminal 101, the sequence continues in 203. If VCC is not supported for the first mobile radio user terminal 101, the radio environment parameter is set to the value zero in 205.

In 203, a check is made whether the first mobile radio user terminal 101 is registered in the IMS core network 114 and can thus utilize communication links by means of the PS domain of the mobile radio network 103. If the first mobile radio user terminal 101 is not registered in the IMS core network 114, the radio environment parameter is set to the value zero in 205. If the first mobile radio user terminal 101 is registered in the IMS core network 114, the radio environment parameter is set to the value one in 206.

As described with reference to FIG. 1, it is assumed that VCC is supported for the first mobile radio user terminal 101 but that the first mobile radio user terminal 101 can currently not use any communication links by means of the CS domain of the mobile radio network 103.

Correspondingly, it is found in 202 that no communication link can be set up by means of the CS domain, and the sequence continues with 204. In 204, it is found that VCC is currently supported for the first mobile radio user terminal 101 and the sequence continues with 203. In 203, it is found that the first mobile radio user terminal 101 is registered in the IMS core network 114 and the sequence correspondingly continues with 206 and the radio environment parameter is set to one.

The radio environment parameter is communicated by the first mobile radio user terminal 101 to the second mobile radio user terminal 102 as part of the setting-up of a communication link between the first mobile radio user terminal 101 and the second mobile radio user terminal 102. In this context, a number of cases can occur. An overview of cases which may occur according to an illustrative embodiment of the invention is shown in FIG. 3.

Figure 3:
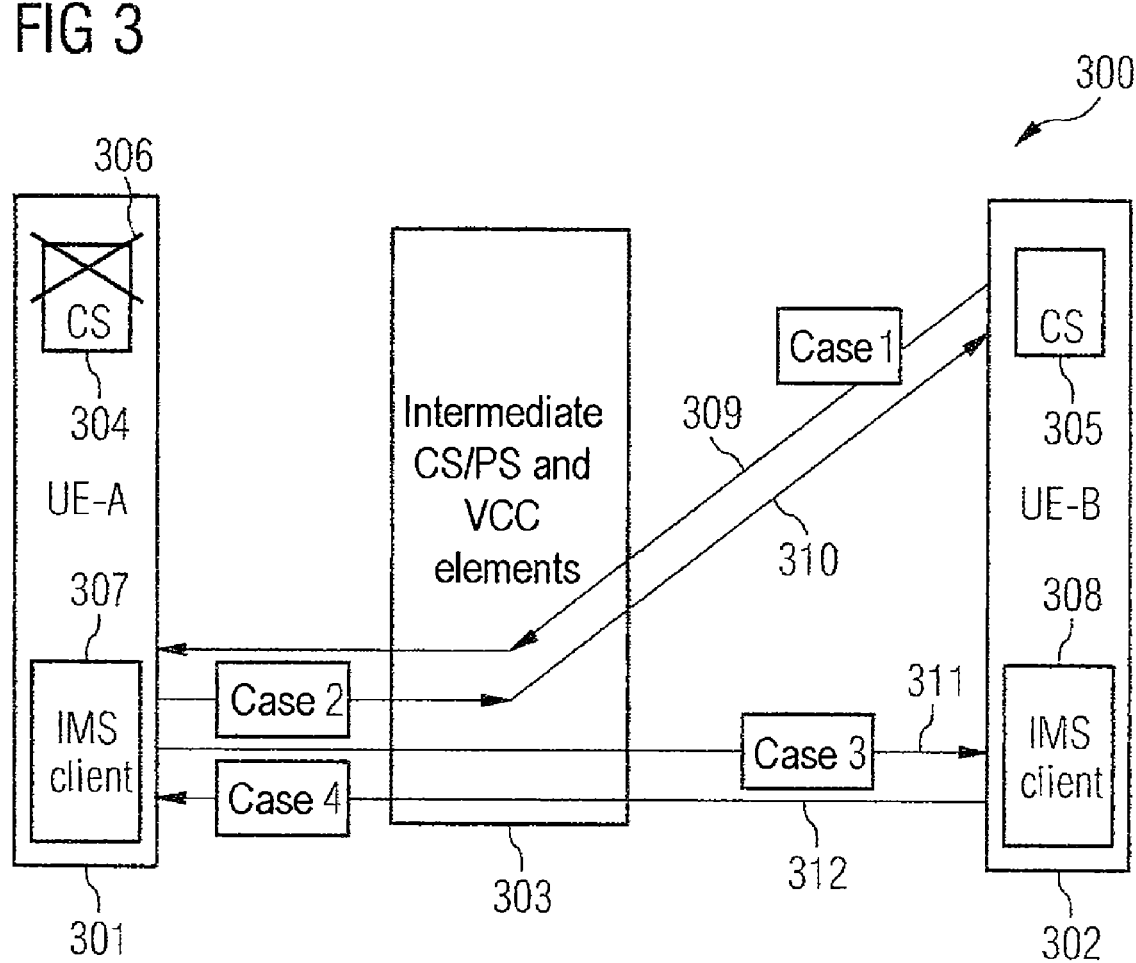
FIG. 3 shows a mobile radio communication system according to an illustrative embodiment of the invention.

FIG. 3 shows a mobile radio communication system 300 according to an illustrative embodiment of the invention.

The mobile radio communication system 300 has a first mobile radio user terminal 301 which corresponds to the first mobile radio user terminal 101 in FIG. 1, and a second mobile radio user terminal 302 which corresponds to the second mobile radio user terminal 102 in FIG. 1. The units of the mobile radio network 103 which have been described more accurately with reference to FIG. 1 are combined as network elements 303 in FIG. 3.

As described with reference to FIG. 1, the first mobile radio user terminal 301 has a first CS client unit 304. As mentioned above, it is assumed that the first mobile radio user terminal 301 is currently not able to set up any communication links by means of the CS domain of the mobile radio network 103. The CS client unit 304 is thus not in operation, which is indicated by the black cross 306 by means of which the first CS client unit 304 in FIG. 3 is crossed out. As described with reference to FIG. 1, the second mobile radio user terminal 302 has a second CS client unit 305.

The first mobile radio user terminal 301 has a first IMS client unit 307. The second mobile radio user terminal 302 has a second IMS client unit 308 as has been described with reference to FIG. 1.

In FIG. 3, four applications are illustrated. The first case is symbolized by a first arrow 309, the second case is symbolized by a second arrow 310, the third case is symbolized by a third arrow 311 and the fourth case is symbolized by a fourth arrow 312.

In the first case, the second mobile radio user terminal 302 sets up a communication link, for example a voice communication link or a video communication link, to the first mobile radio user terminal 302 by means of the CS domain. The first mobile radio user terminal 301 participates in this communication link by means of the PS domain.

In the second case, the first mobile radio user terminal sets up a communication link, for example a voice communication link or a video communication link, to the second mobile radio user terminal 302 which is utilized by the second mobile radio user terminal by means of the CS domain.

In the third case, the first mobile radio user terminal 301 initiates a packet-switched communication link to the second mobile radio user terminal 302 and in the fourth case, the second mobile radio user terminal 302 sets up a packet-switched communication link to the first mobile radio user terminal 301, that is to say initiates the setting-up of a packet-switched communication link to the first mobile radio user terminal 301.

Figure 4:
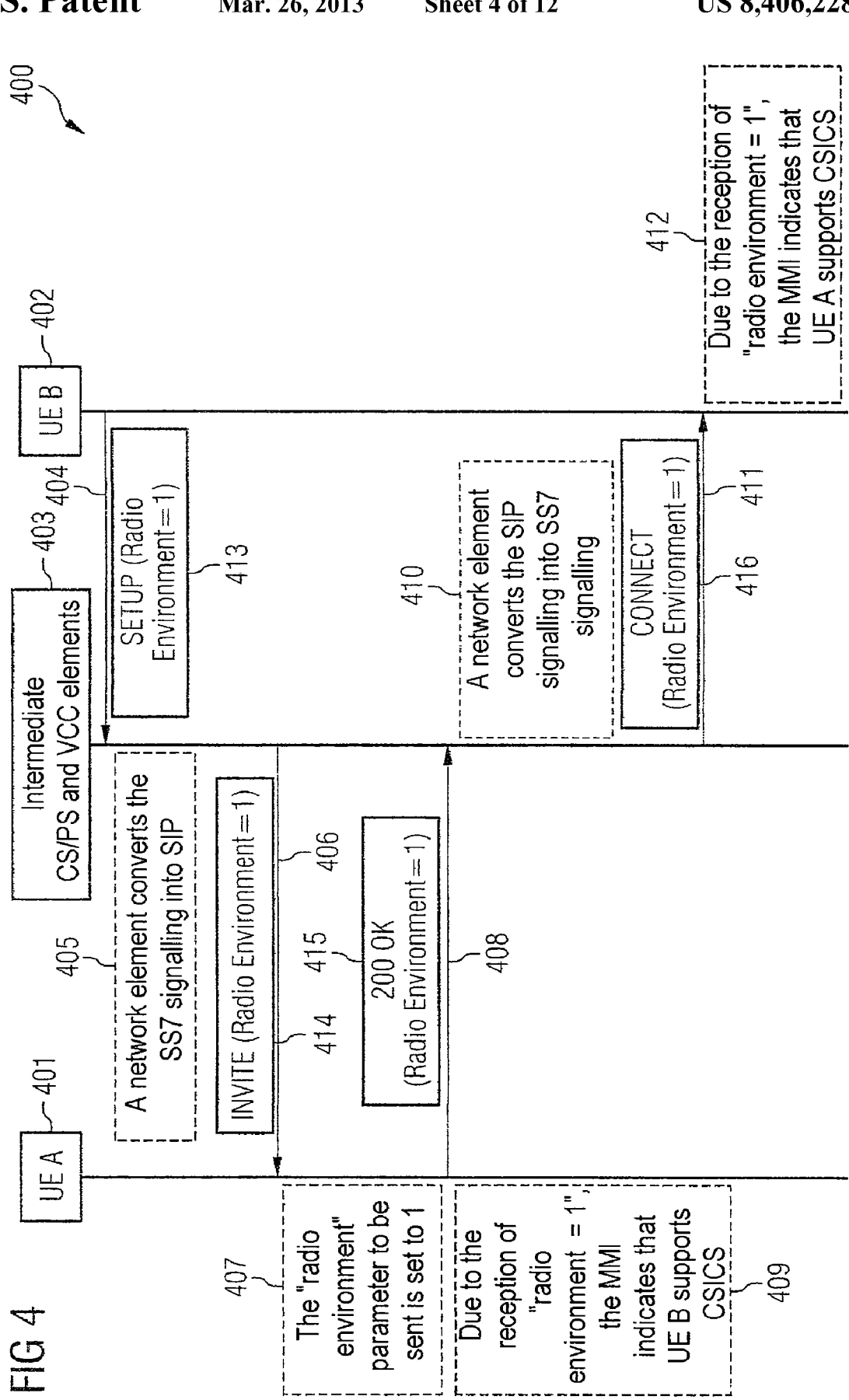
FIG. 4 shows a message flowchart according to an illustrative embodiment of the invention.

The message flow in the first case according to an illustrative embodiment of the invention is shown in FIG. 4.

FIG. 4 shows a message flowchart 400 according to an illustrative embodiment of the invention.

The message flow shown occurs between a first mobile radio user terminal 401, a second mobile radio user terminal 402 and network elements 403 which are arranged and embodied as described with reference to FIG. 3.

In 404, the second mobile radio user terminal 402 requests the setting-up of a communication link in which the second mobile radio user terminal 402 wishes to participate by means of the CS domain, by sending out a setup message 413 to the network elements 403. Since the second mobile radio user terminal 402 wishes to utilize, by means of the CS domain, the communication link to be set up, the network element of the network elements 403 which receives the setup message 413 is an element of the CS domain. The setup message 413 contains the information that the second mobile radio user terminal 402 currently supports CSI in the form of the radio environment parameter which is set to the value one.

In 405, the setup message 413 is converted into an Invite message 414 by a network element of the network elements 403. The setup message 413 is arranged in accordance with the SS7 (signalling system No. 7) and the Invite message 414 is arranged according to the SIP (Session Initiation Protocol) protocol. The conversion of the setup message 413 into the Invite message 414 thus corresponds to a conversion of the SS7 protocol into the SIP protocol. This is done since the first mobile radio user terminal 401 is intended to participate, by means of the PS domain, in the communication link to be set up since it currently cannot set up a communication link by means of the CS domain.

In 406, the Invite message 414 is communicated to the first mobile radio user terminal 401. The Invite message 414 contains the information that the second mobile radio user terminal 402 currently supports CSI in the form of the radio environment parameter which is set to the value 1.

In 407, the first mobile radio user terminal 401 sets the radio environment parameter to the value one according to the determination of the value of the radio environment parameter as has been explained with reference to FIG. 2. In 408, the first mobile radio user terminal 401 communicates a 200 OK message 415 according to the SIP protocol to the network elements 403. The 200 OK message 415 contains the radio environment parameter which is set to the value 1 according to 407.

The 200 OK message 415 is received by a network element of the network elements 403 which belongs to the PS domain, and the 200 OK message 415 is converted into a Connect message 416 which is arranged according to the SS7 protocol.

In 411, the Connect message 416 is communicated to the second mobile radio user terminal 402. The Connect message 416 contains the information that the first mobile radio user terminal 401 currently supports CSI in the form of the radio environment parameter set to the value one.

Since the first mobile radio user terminal 407 has received the information, by means of the Invite message 414 and the radio environment parameter with the value one contained therein, that the second mobile radio user terminal 402 currently supports CSI, the user of the first mobile radio user terminal 401 is shown in 409 by means of the user interface, for example a display, that the first mobile radio user terminal 401 supports CSI.

Analogously, the user of the second mobile radio user terminal 402 is shown in 412 that the first mobile radio user terminal 401 currently supports CSI which has been signalled to the second mobile radio user terminal 402 by means of the Connect message 416.

The network element of the network elements 403 which carries out the processes 405 and 410, that is to say converts the SS7 signalling into a SIP signalling and conversely, is, for example, a MGCF (Media Gateway Control Function) which is part of the home network of the user of the first mobile radio user terminal 401.

Figure 5:
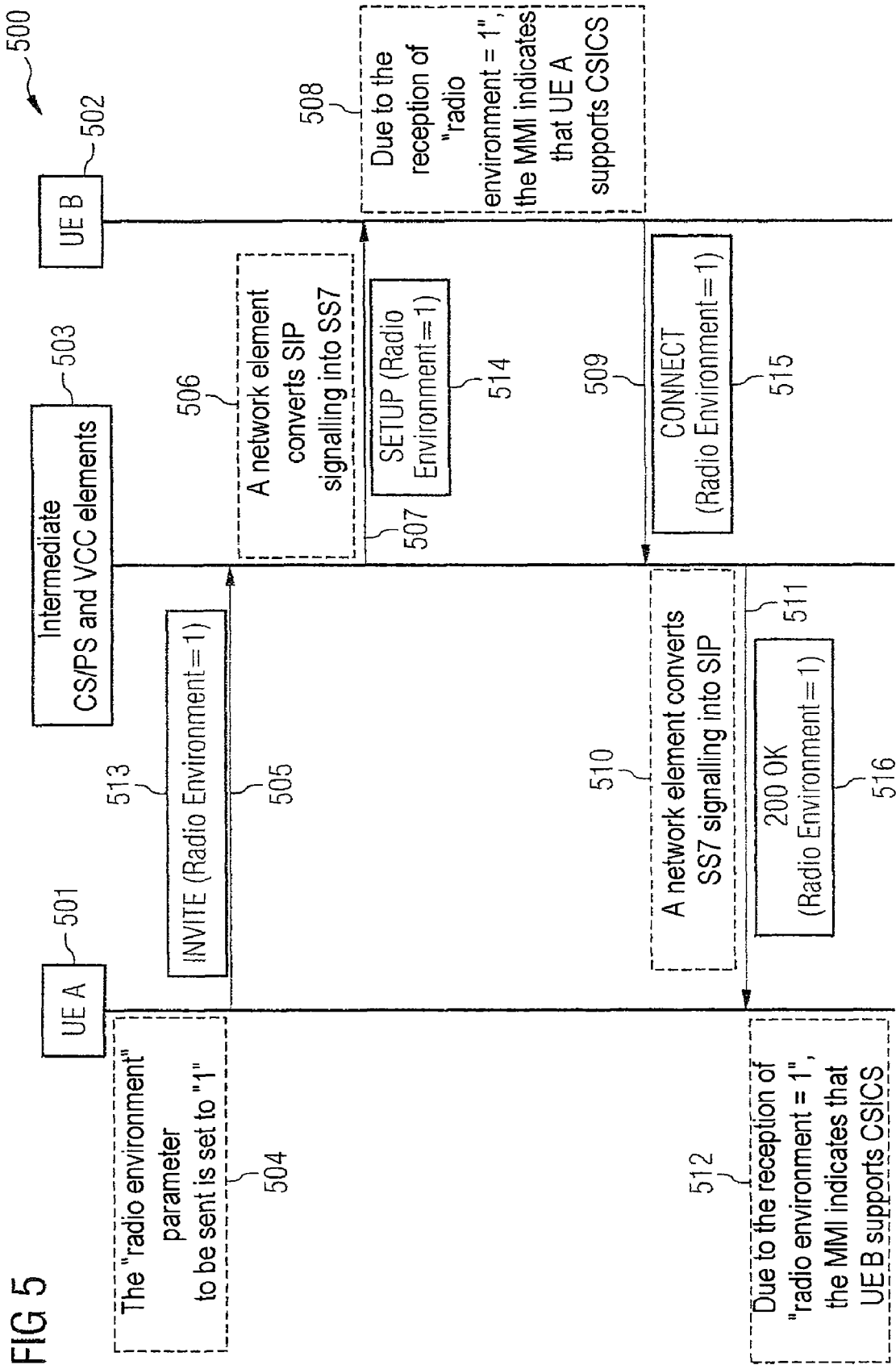
FIG. 5 shows a message flowchart according to an illustrative embodiment of the invention.

FIG. 5 shows the message flow according to an illustrative embodiment of the invention in the second case.

FIG. 5 shows a message flowchart 500 according to an illustrative embodiment of the invention.

Analogously to FIG. 4, the message flow shown takes place between a first mobile radio user terminal 501, a second mobile radio user terminal 502 and network elements 503.

In 504, the first mobile radio user terminal 501 sets the radio environment parameters to one according to the sequence explained with reference to FIG. 2.

In 505, the first mobile radio user terminal 501 communicates an Invite message 513 which, in the form of the radio environment parameter set to one, contains the information that the first mobile radio user terminal 501 currently supports CSI.

A network element of the network elements 503 which is part of the PS domain receives the Invite message 513.

In 506, the Invite message 513 is converted into a setup message 514. The Invite message 513 is arranged according to the SIP protocol and the setup message 514 is arranged according to the SS7 protocol. The network element performing this conversion is, for example, an MGCF. The setup message 514 contains the information that the first mobile radio user terminal 501 currently supports CSI in the form of the radio environment parameter which is set to the value one.

The setup message 514 is received by the second mobile radio user terminal 502 which shows its user in 508 that the first mobile radio user terminal 501 currently supports CSI which has been indicated to the second mobile radio user terminal 502 by means of the radio environment parameter contained in the setup message 514.

In 509, the second mobile radio user terminal 502 communicates a Connect message 515 to the network elements 503 by means of which the setting-up of the communication link to the first mobile radio user terminal 501 which has been requested by means of the Invite message 513 is accepted. The Connect message 515 is arranged according to the SS7 protocol which corresponds to the fact that the communication link is to be utilized by the second mobile radio user terminal 502 by means of the CS domain. The Connect message 515 contains the radio environment parameter set to one, by means of which it is indicated that the second mobile radio user terminal 502 currently also supports CSI.

In 510, the Connect message 515 is converted into a 200 OK message 516 which also contains the radio environment parameter set to one. The conversion is performed by a network element of the network elements 503, for example by an MGCF.

In 511, the 200 OK message 516 is communicated to the first mobile radio user terminal 501. In 512, the first mobile radio user terminal 501 indicates to the user of the first mobile radio user terminal 501 that the second mobile radio user terminal 502 currently supports CSI.

Figure 6:
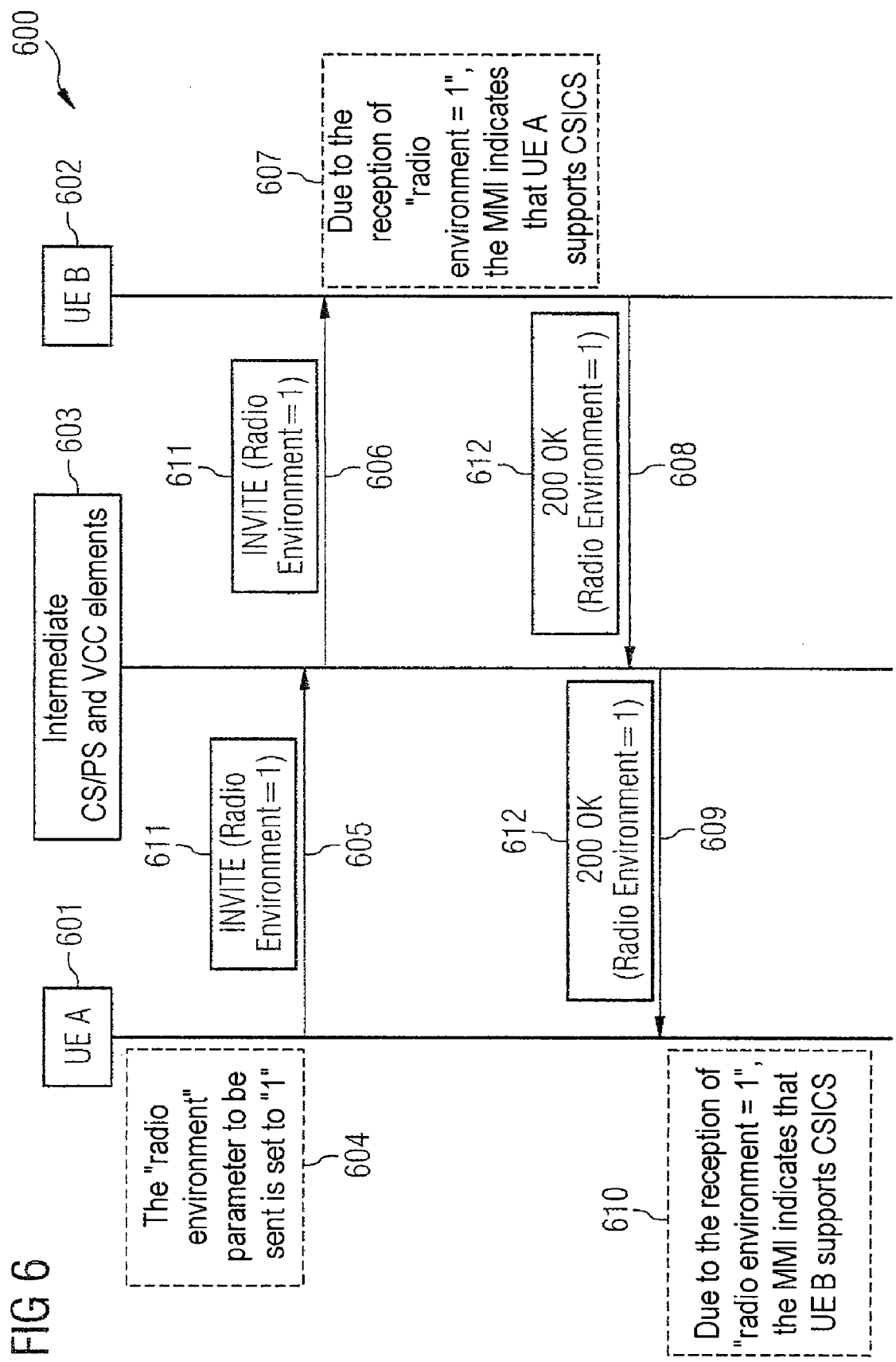
FIG. 6 shows a message flowchart according to an illustrative embodiment of the invention.

FIG. 6 shows the message flow for the third application according to an illustrative embodiment of the invention.

FIG. 6 shows a message flowchart 600 according to an illustrative embodiment of the invention.

Analogously to FIG. 4, the message flow shown takes place between a first mobile radio user terminal 601, a second mobile radio user terminal 602 and network elements 603.

In 604, the first mobile radio user terminal sets the radio environment parameter to the value one in accordance with the sequence shown in FIG. 2.

In 605, the mobile radio user terminal 601 sends an Invite message 611 to the network elements 603 by means of which it requests the setting-up of a packet-switched communication link to the second mobile radio user terminal 602. The Invite message 611 contains the radio environment parameter set to the value one, and thus the information that the first mobile radio user terminal 601 currently supports CSI. In 606, the Invite message 611 is forwarded to the second mobile radio user terminal 602.

In 607, the user of the second mobile radio user terminal is shown that the first mobile radio user terminal 601 currently supports CSI. This information is determined by the second mobile radio user terminal 602 from the Invite message 611. It is assumed that the user of the second mobile radio user terminal 602 agrees with the setting-up of the requested communication link. Accordingly, the second mobile radio user terminal 602 communicates a 200 OK message 612 to the network elements 603 in 608.

The 200 OK message 612 includes, in the form of the radio environment parameter set to one, the information that the second mobile radio user terminal 602 currently supports In 609, the 200 OK message 612 is forwarded by the network elements 603 to the first mobile radio user terminal 601. In 610, the first mobile radio user terminal 601 indicates to the user of the first mobile radio user terminal 601 that the second mobile radio user terminal 602 currently supports CSI. This information is determined by the first mobile radio user terminal 601 from the 200 OK message 612. The Invite message 611 and the 200 OK message 612 are arranged in accordance with the SIP protocol.

Figure 7:
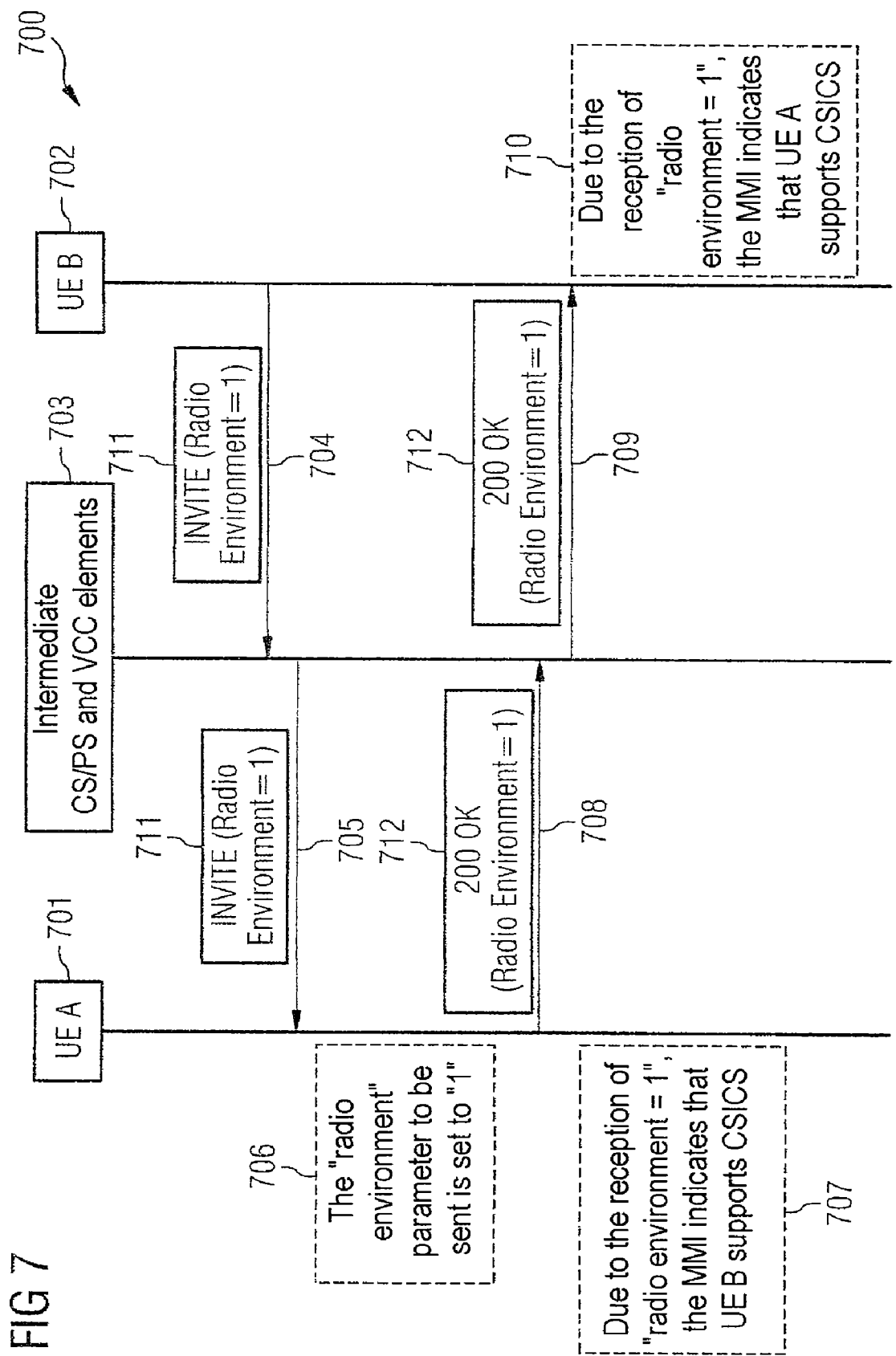
FIG. 7 shows a message flowchart according to an illustrative embodiment of the invention.

FIG. 7 shows the message flow according to an illustrative embodiment of the invention for the fourth application.

FIG. 7 shows a message flowchart 700 according to an illustrative embodiment of the invention.

Analogously to FIG. 4, the message flow shown takes place between a first mobile radio user terminal 701, a second mobile radio user terminal 702 and network elements 703.

In 704, the second mobile radio user terminal 702 requests the setting up of a packet-switched communication link between the second mobile radio user terminal 702 and the first mobile radio user terminal 701 by means of an Invite message 711. The Invite message 711 contains the information that the second mobile radio user terminal 702 currently supports CSI in the form of the radio environment parameter having the value one. The Invite message 711 is forwarded by the network elements 703 in 705.

The first mobile radio user terminal 701 receives the Invite message 711 and sets the radio environment parameter to the value one in 706 as has been described with reference to FIG. 2. It is assumed that the user of the first mobile radio user terminal 701 agrees with the setting-up of the packet-switched communication link. Accordingly, the first mobile radio user terminal 701 sends to the network elements 703, in 708, a 200 OK message 712 by means of which the setting-up of the packet-switched communication link is accepted. The 200 OK message 712 contains the radio environment parameter with the value 1 so that it is signalled that the first mobile radio user terminal 701 currently supports CSI.

In 709, the 200 OK message 712 is forwarded by the network elements 703 to the second mobile radio user terminal 702. In 710, the user of the second mobile radio user terminal 702 is shown that the first mobile radio user terminal 701 currently supports CSI.

Analogously, in 707, the user of the first mobile radio user terminal 701 is shown that the second mobile radio user terminal 702 currently supports CSI. The Invite message 711 and the 200 OK message 712 are arranged in accordance with the SIP protocol.

In the illustrative embodiments which have been described with reference to FIG. 4, FIG. 5, FIG. 6 and FIG. 7, the first mobile radio user terminal 701 determines, in accordance with the sequence shown in FIG. 2, the value of the radio environment parameter which it communicates to the second mobile radio user terminal 302. In the text which follows, illustrative embodiments, in which a network element sets the radio environment parameter to the value one in accordance with the fact that the first mobile radio user terminal 301 supports CSI, and communicates to the second mobile radio user terminal 302, are explained with reference to FIG. 8, FIG. 9, FIG. 10 and FIG. 11. These illustrative embodiments have the advantage that the first mobile radio user terminal 301, compared with conventional mobile radio user terminals, does not need to have an extended functionality but that only a network element needs to be provided which sets the radio environment parameter in accordance with the current capability of the first mobile radio user terminal 301 to support CSI or not.

Figure 8:
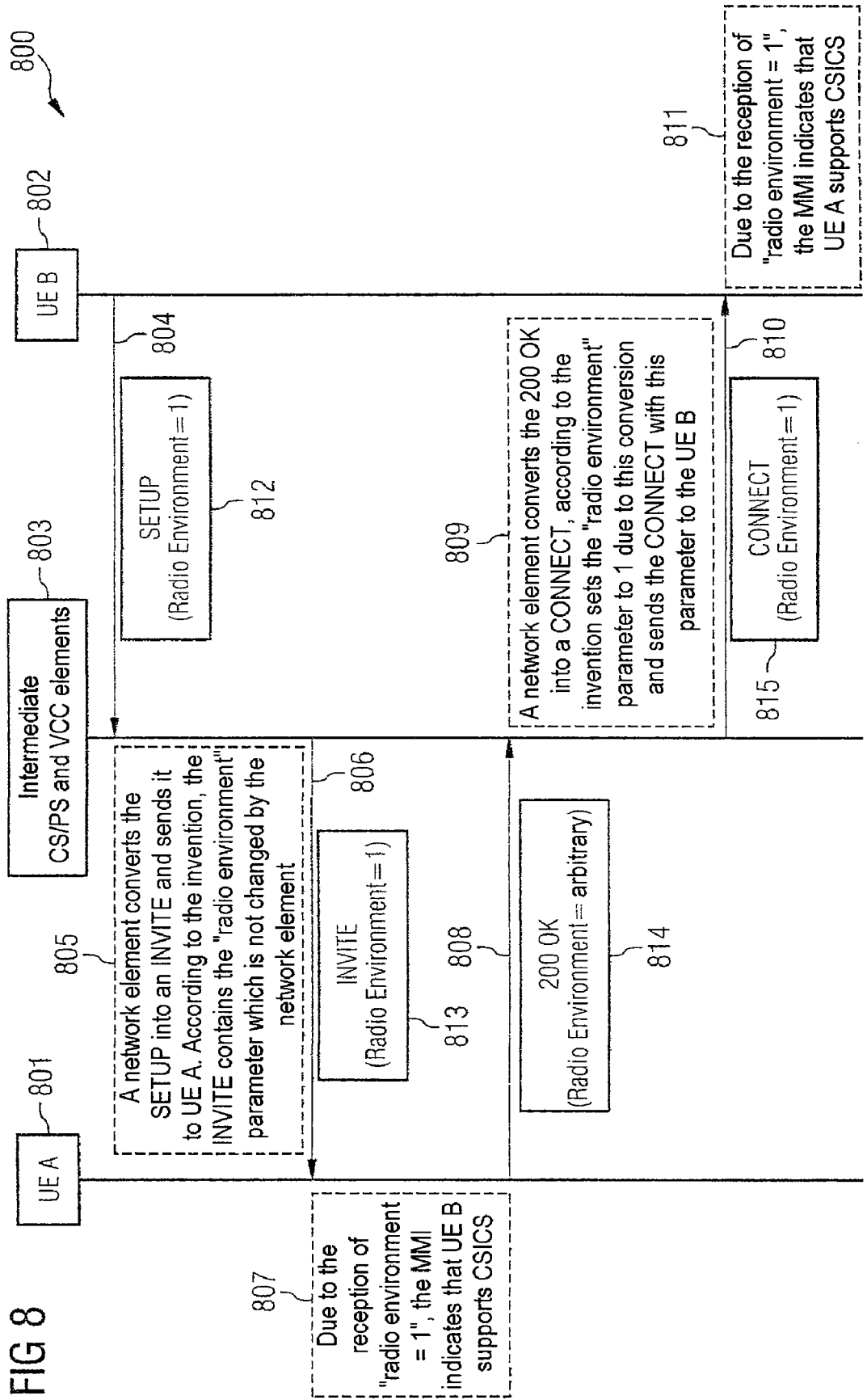
FIG. 8 shows a message flowchart according to the illustrative embodiment of the invention.

FIG. 8 shows such an illustrative embodiment of the first application.

FIG. 8 shows a message flowchart 800 according to the illustrative embodiment of the invention.

Analogously to FIG. 4, the message flow shown takes place between a first mobile radio user terminal 801, a second mobile radio user terminal 802 and network elements 803.

In 804, the second mobile radio user terminal 802 requests, by means of the CS domain, the setting-up of a communication link, for example a voice communication link or a video communication link by sending a setup message 812 to the network elements 803. The setup message 812 contains the radio environment parameter which is set to the value one and in this way signals that the second mobile radio user terminal 802 currently supports CSI since it can both set up communication links by means of the CS domain and utilize packet-switched communication links by means of the PS domain.

A network element of the network elements 803, for example an MGCF, converts the setup message 812 into an Invite message 813, that is to say performs a protocol conversion from the SS7 protocol to the SIP protocol. In 806, the Invite message 813 is communicated by the network elements 803 to the first mobile radio user terminal 801.

The Invite message 813 contains the radio environment parameter which is set to the value one. The network element which converts the setup message 812 into the Invite message 813, in other words generates an Invite message 813 for the setup message 812, leaves the value of the radio environment parameter unchanged during the conversion. Accordingly, the radio environment parameter in the Invite message 813 has the value one. In one embodiment in which the radio environment parameter in the setup message 812 has the value zero since the second mobile radio user terminal 802 currently does not support CSI, the radio environment parameter also has the value of zero in the Invite message 813.

In 807, the first mobile radio user terminal 801 indicates to the user of the first mobile radio user terminal 801 that the second mobile radio user terminal 802 currently supports CSI which has been signalled to the first mobile radio user terminal 801 by the radio environment parameter in the Invite message 813.

It is assumed that the user of the first mobile radio user terminal 801 agrees with the setting-up of the communication link. Accordingly, the first mobile radio user terminal sends a 200 OK message to the network elements 803 in 808. In contrast to the illustrative embodiments described with reference to FIG. 4, the 200 OK message 814 does not have the radio environment parameter set to the value one but does not include the radio environment parameter or includes the radio environment parameter with an arbitrary value.

In 809, a network element of the network elements 803 determines whether the first mobile radio user terminal 801 currently supports CSI. This is done, for example, analogously to the sequence described in FIG. 2. The network element sets the radio environment parameter to the value one if the first mobile radio user terminal 801 currently supports CSI which is assumed in the present example, or sets the value of the radio environment parameter to the value zero if the first mobile radio user terminal 801 currently does not support CSI. The network element is, for example, an MGFC, the VCC application server unit 120 described with reference to FIG. 1, or an IMS application server unit 119.

The 200 OK message 814 is also converted into a Connect message 815. This conversion can be performed by the network element which also determines whether the first mobile radio user terminal 801 currently supports CSI and accordingly specifies the value of the radio environment parameter, or by another network element. According to the determination whether the first mobile radio user terminal 801 currently supports CSI (which is assumed, as mentioned), the Connect message 815 has the radio environment parameter set to one.

In 810, the Connect message 815 is communicated to the second mobile radio user terminal 802.

In 811, the second mobile radio user terminal 802 indicates to the user of the second mobile radio user terminal 802 that the first mobile radio user terminal 801 currently supports CSI which has been signalled to the second mobile radio user terminal 802 by means of the Connect message 815.

Figure 9:
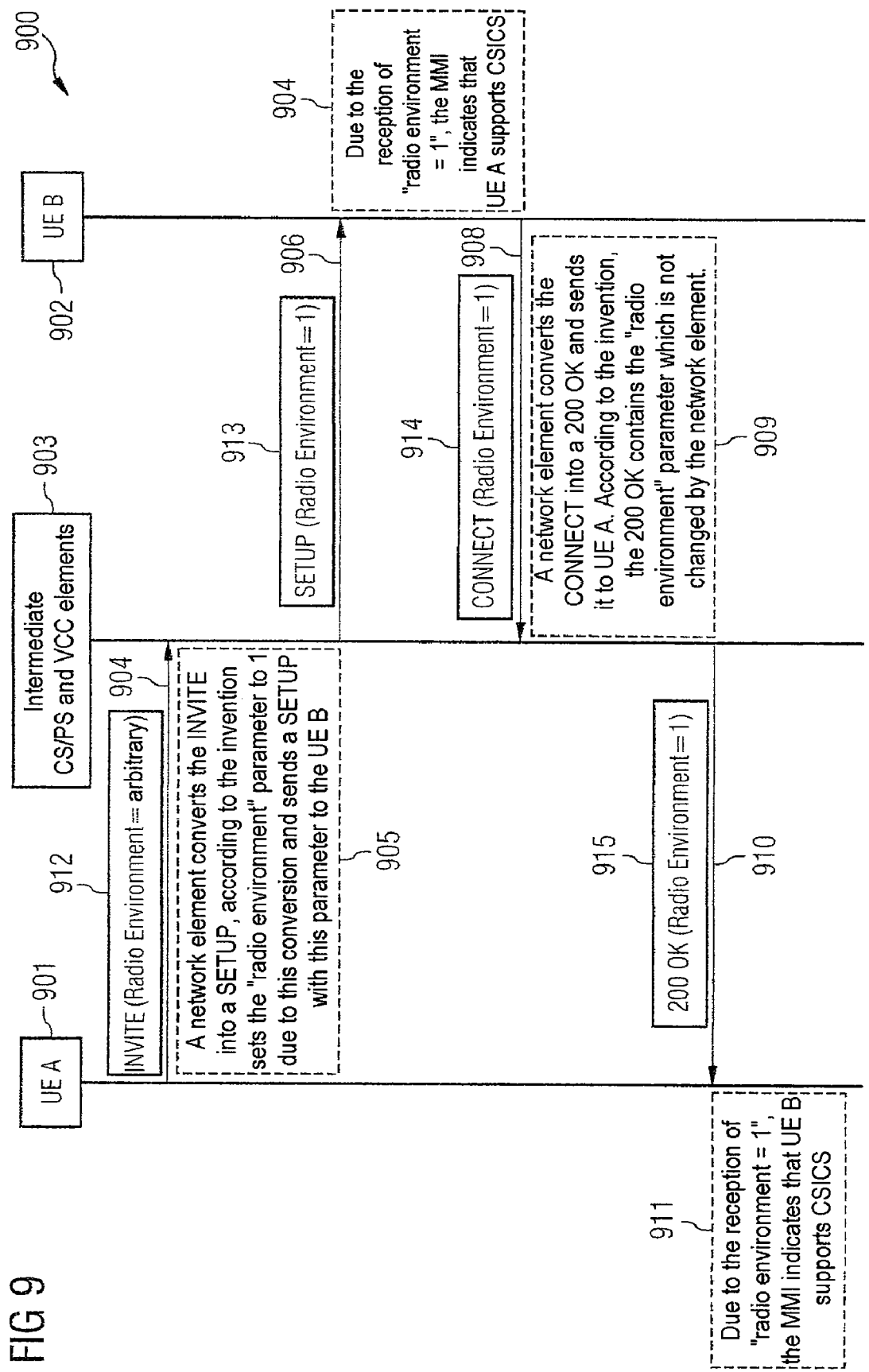
FIG. 9 shows a message flowchart according to an illustrative embodiment of the invention.

The message flow for an illustrative embodiment of the invention, in which the value of the radio environment parameter is determined by a network element, for the second application is shown in FIG. 9.

FIG. 9 shows a message flowchart 900 according to an illustrative embodiment of the invention.

Analogously to FIG. 4, the message flow shown takes place between a first mobile radio user terminal 901, a second mobile radio user terminal 902 and network elements 903.

In 904, the first mobile radio user terminal 901 requests the setting-up of a communication link to the second mobile radio user terminal 902 by means of an Invite message 912. In contrast to FIG. 5, the Invite message 912 does not contain the radio environment parameter or contains it with an arbitrary value.

Analogously to 809 in FIG. 8, a network element of the network elements 903 determines in 905 the value of the radio environment parameter. The Invite message 912 is converted by a network element of the network elements 903 into a set up message 913 which contains the value determined for the radio environment parameter.

In 906, the setup message 913 is communicated to the second mobile radio user terminal 902. Analogously to the illustrative embodiment which is described with reference to FIG. 8, the conversion of the Invite message 912 into the setup message 913 can be performed by the same network element which determines the value of the radio environment parameter, or by another network element.

In 907, the user of the second mobile radio user terminal 902 is shown that the first mobile radio user terminal 901 currently supports CSI which has been signalled to the second mobile radio user terminal 902 by means of the setup message 913. It is assumed that the user of the second mobile radio user terminal 902 agrees with the setting-up of the communication link. In 908, accordingly, a Connect message 914 which is arranged like the setup message 913 according to the SS7 protocol is communicated to the network elements 903. The Connect message contains the radio environment parameter with the value one, which signals that the second mobile radio user terminal currently supports CSI.

In 909, the Connect message 914 is converted into a 200 OK message 915 which is arranged like the Invite message 912 according to the SIP protocol. The 200 OK message 915 has the radio environment parameter with the value 1. Analogously to 805, the network element which converts the Connect message 914 into the 200 OK message 915 leaves the value of the radio environment parameter, which specifies whether the second mobile radio user terminal currently supports CSI, unchanged. In 910, the 200 OK message 915 is communicated to the first mobile radio user terminal 901. In 911, the user of the first mobile radio user terminal 901 is shown that the second mobile radio user terminal 902 currently supports CSI.

In the text which follows, the message flow according to an illustrative embodiment of the invention in which a network element determines whether the first mobile radio user terminal 301 currently supports CSI or not, is explained.

Figure 10:
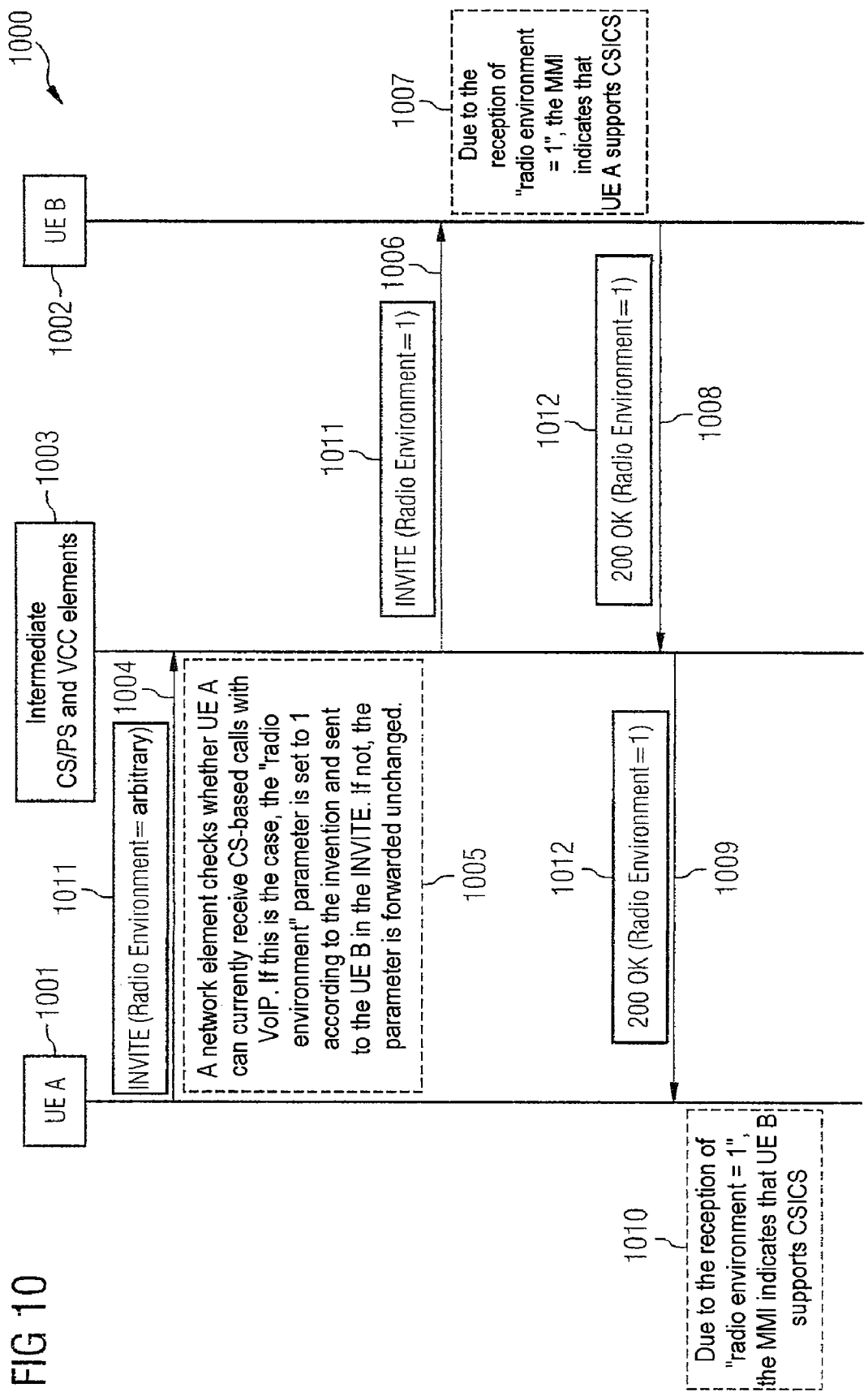
FIG. 10 shows a message flowchart according to an illustrative embodiment of the invention.

FIG. 10 shows a message flow chart 1000 according to an illustrative embodiment of the invention.

Analogously to FIG. 4, the message flow shown takes place between a first mobile radio user terminal 1001, a second mobile radio user terminal 1002 and network elements 1003.

In 1004, the first mobile radio user terminal 1001 requests the setting-up of a packet-switched communication link to the second mobile radio user terminal 102 by means of an Invite message 1011. In contrast to FIG. 6, the Invite message does not contain the radio environment parameter or contains the radio environment parameter which, however, is set to an arbitrary value.

Analogously to 809, it is determined in 1005 whether the first mobile radio user terminal 1001 currently supports CSI and the radio environment parameter is set accordingly. Since it is assumed that the first mobile radio user terminal 1001 currently supports CSI, the radio environment parameter is set to the value one. The radio environment parameter having the value one is inserted into the Invite message 1011 or, respectively, the radio environment parameter is set to the value one in the Invite message 1011 and the Invite message 1011 is forwarded to the second mobile radio user terminal 1002 in 1006.

In 1007, the user of the second mobile radio user terminal 1002 is shown that the first mobile radio user terminal 1001 currently supports CSI which has been signalled to the second mobile radio user terminal 1002 by means of the Invite message 1011 and the radio environment parameter set to the value one, contained therein.

It is assumed that the user of the second mobile radio user terminal 1002 agrees with the setting-up of the packet-switched communication link. Accordingly, in 1008, a 200 OK message 1012 is communicated by the second mobile radio user terminal 1002 to the network elements 1003 which is forwarded in 1009 to the first mobile radio user terminal 1001 by the network elements 1003. The 200 OK message 1012 contains the radio environment parameter set to the value one, which specifies that the second mobile radio user terminal 1002 currently supports CSI.

In 1010, the user of the first mobile radio user terminal 1001 is shown that the second mobile radio user terminal 1002 currently supports CSI which has been signalled by means of the 200 OK message 1012.

The network element which forwards the Invite message 1011 and the 200 OK message 1012 is, for example, a CSCF (Call Session Control Function) which is part of the home network of the first mobile radio user terminal 1001.

In the text which follows, a message flow according to an illustrative embodiment is described which corresponds to the fourth application, and in which a network element determines whether the first mobile radio user terminal 301 currently supports CSI.

FIG. 11 shows a message flow chart 1100 according to an illustrative embodiment of the invention.

Analogously to FIG. 4, the message flow shown takes place between a first mobile radio user terminal 1101, a second mobile radio user terminal 1102 and network elements 1103.

In 1104, the second mobile radio user terminal 1102 requests the setting-up of a packet-switched communication link between the first mobile radio user terminal 1101 and the second mobile radio user terminal 1102 by sending an Invite message 1111. In 1105, the Invite message 1111 is forwarded to the first mobile radio user terminal 1101. This is carried out, for example, by a CSCF. The Invite message 1111 is arranged according to SIP and the second mobile radio user terminal 1102 has inserted the radio environment parameter with the value one into the Invite message 1111 in order to indicate that the second mobile radio user terminal 1102 currently supports CSI.

In 1106, the first mobile radio user terminal 1101 indicates to the user of the first mobile radio user terminal 1101 that the second mobile radio user terminal 1102 currently supports CSI as has been signalled by means of the radio environment parameter contained in the Invite message 1111.

In 1107, the first mobile radio user terminal 1101 communicates a 200 OK message 1112 in order to indicate that the user of the first mobile radio user terminal 1101 agrees that the requested packet-switched communication link is set up and in order to indicate that the communication link is to be set up accordingly.

In contrast to the illustrative embodiment explained with reference to FIG. 7, the 200 OK message 1112 does not contain the radio environment parameter set to one but the radio environment parameter with an arbitrary value (or does not contain the radio environment parameter at all). Analogously to 809, a network element of the network elements 1103 determines whether the first mobile radio user terminal 1101 currently supports CSI. It accordingly specifies the radio environment parameter (to the value one in the present case since it is assumed that the first mobile radio user terminal 1101 currently supports CSI) and sets the radio environment parameter in the 200 OK message 1112 to the corresponding value (to the value one in the current example). In 1109, the 200 OK message 1112 is forwarded to the second mobile radio user terminal 1102.

In 1110, the second mobile radio user terminal 1102 indicates to the user of the second mobile radio user terminal 1102 that the first mobile radio user terminal 1101 currently supports CSI as has been signalled by means of the 200 OK message 1112.

In the further text, a message generating device which is provided in accordance with an illustrative embodiment of the invention is described with reference to FIG. 12.

FIG. 12 shows a message generating arrangement 1200 according to an illustrative embodiment of the invention.

The message generating arrangement 1200 is part of a communication system 1201 and has a determining device 1206 which determines whether a first communication terminal 1202 of the communication system can participate, by means of packet-switching network elements 1204 of the communication system, in a communication link in which a second communication terminal 1203 of the communication system is participating by means of circuit-switching network elements 1205 of the communication system.

The message generating arrangement also has a message generating device 1207 which, when it has been determined that the first communication terminal 1203 can participate, by means of the packet-switching network elements 1204, in a communication link in which the second communication terminal 1202 is participating by means of the circuit-switching network elements 1205, generates a message 1208 which has the information 1209 that the first communication terminal supports that a packet-switched communication link and a circuit-switched communication link can exist simultaneously between the first communication terminal and the second communication terminal.

According to a further illustrative embodiment of the invention, a message generating arrangement of a communication system is provided which comprises:

a determining device which is set up to determine whether a first communication terminal of the communication system can participate, by means of the packet-switching domain of the communication system, in a communication link in which a second communication terminal of the communication system is participating by means of the circuit-switching domain of the communication system;

a message generating device which is set up, when it has been determined that the first communication terminal can participate, by means of the packet-switching domain, in a communication link in which the second communication terminal is participating by means of the circuit-switching domain, to generate a message which has the information that the first communication terminal supports that a packet-switched communication link and a circuit-switched communication link can exist simultaneously between the first communication terminal and the second communication terminal.

According to a further illustrative embodiment of the invention, a communication terminal of a communication system is provided which comprises:

a determining device which is set up to determine whether the communication terminal of the communication system can participate, by means of packet-switching network elements of the communication system, in a communication link in which a further communication terminal of the communication system is participating by means of circuit-switching network elements of the communication system;

a message generating device which is set up, when it has been determined that the communication terminal can participate, by means of the packet-switching network elements, in a communication link in which the further communication terminal is participating by means of the circuit-switching network elements, to generate a message which has the information that the communication terminal supports that a packet-switched communication link and a circuit-switched communication link can exist simultaneously between the communication terminal and the further communication terminal.

According to a further illustrative embodiment of the invention, a server unit of a communication system is provided which comprises:

a determining device which is set up to determine whether a first communication terminal of the communication system can participate, by means of packet-switching network elements of the communication system, in a communication link in which a second communication terminal of the communication system is participating by means of circuit-switching network elements of the communication system;

a message generating device which is set up, when it has been determined that the first communication terminal can participate, by means of the packet-switching network elements, in a communication link in which the second communication terminal is participating by means of the circuit-switching network elements, to generate a message which has the information that the first communication terminal supports that a packet-switched communication link and a circuit-switched communication link can exist simultaneously between the first communication terminal and the second communication terminal.

What is claimed is:

1. A message generating arrangement of a communication system, comprising:
   a determining device configured to determine whether a first communication terminal of the communication system is enabled to participate, by means of only packet-switching network elements of the communication system in an absence of circuit-switching network elements in the first communication terminal, in a communication link in which a second communication terminal of the communication system is participating by means of circuit-switching network elements of the communication system; and
   a message generating device configured to generate, if it has been determined that the first communication terminal is enabled to participate, by means of only the packet-switching network elements, in a communication link in which the second communication terminal is participating by means of the circuit-switching network elements, a message comprising the information that the first communication terminal supports that a packet-switched communication link and a circuit-switched communication link is enabled to exist in parallel between the first communication terminal and the second communication terminal.

2. The message generating arrangement according to claim 1, wherein the message generating arrangement is arranged in the first communication terminal.

3. The message generating arrangement according to claim 1, wherein the communication system has a communication network and the message generating device is a unit of the communication network.

4. The message generating arrangement according to claim 3, wherein the message is generated by the message generating device as part of a protocol conversion from a signalling protocol which is used by the packet-switching network elements, to a signalling protocol which is used by the circuit-switching network elements.

5. The message generating arrangement according to claim 4, wherein the signalling protocol used by the packet-switching network elements is Session Initiation Protocol (SIP).

6. The message generating arrangement according to claim 5, wherein the signalling protocol used by the circuit-switching network elements is Signalling System Number 7 (SS7).

7. The message generating arrangement according to claim 3, wherein the communication network is a mobile radio communication network.

8. The message generating arrangement according to claim 1, wherein the first communication terminal is a mobile radio user terminal.

9. The message generating arrangement according to claim 1, wherein the message generating device is configured to generate the message when the first communication terminal is registered with a network element of the communication system for utilizing packet-switched communication links.

10. The message generating arrangement according to claim 1, wherein the determining device is configured to determine whether Voice Call Continuity Between Circuit Switched (CS) and Internet Protocol Multimedia Sub-System (IMS) (VCC) is supported for the first communication terminal.

11. The message generating arrangement according to claim 1, wherein the message comprises the information that the first communication terminal supports Combining Circuit Switched (CS) calls and Internet Protocol Multimedia Sub-System (IMS) sessions (CSI).

12. A method for generating a message comprising:
   determining whether a first communication terminal of a communication system is enabled to participate, by means of only packet-switching network elements of the communication system, in a communication link in which a second communication terminal of the communication system is participating by means of circuit-switching network elements of the communication system; and
   if it has been determined that the first communication terminal is enabled to participate, by means of only the packet-switching network elements in an absence of circuit-switching network elements in the first communication terminal, in a communication link in which the second communication terminal is participating by means of the circuit-switching network elements, generating a message comprising the information that the first communication terminal supports that a packet-switched communication link and a circuit-switched communication link is enabled to exist in parallel between the first communication terminal and the second communication terminal.

13. A message generating arrangement of a communication system, comprising:
   a determining device configured to determine whether a first communication terminal of the communication system is enabled to participate, by means of only the packet-switching domain of the communication system in an absence of circuit-switching network elements in the first communication terminal, in a communication link in which a second communication terminal of the communication system is participating by means of the circuit-switching domain of the communication system; and
   a message generating device configured to generate, if it has been determined that the first communication terminal is enabled to participate, by means of only the packet-switching domain, in a communication link in which the second communication terminal is participating by means of the circuit-switching domain, a message comprising the information that the first communication terminal supports that a packet-switched communication link and a circuit-switched communication link is enabled to exist in parallel between the first communication terminal and the second communication terminal.

14. A communication terminal of a communication system, comprising:
   a determining device configured to determine whether the communication terminal of the communication system is enabled to participate, by means of only packet-switching network elements of the communication system in an absence of circuit-switching network elements in the first communication terminal, in a communication link in which a further communication terminal of the communication system is participating by means of circuit-switching network elements of the communication system; and
   a message generating device configured to generate, if it has been determined that the communication terminal is enabled to participate, by means of only the packet-switching network elements, in a communication link in which the further communication terminal is participating by means of the circuit-switching network elements, a message comprising the information that the communication terminal supports that a packet-switched communication link and a circuit-switched communication link is enabled to exist in parallel between the communication terminal and the further communication terminal.

15. A server unit of a communication system, comprising:

a determining device configured to determine whether a first communication terminal of the communication system is enabled to participate, by means of only packet-switching network elements of the communication system in an absence of circuit-switching network elements in the first communication terminal, in a communication link in which a second communication terminal of the communication system is participating by means of circuit-switching network elements of the communication system; and a message generating device configured to generate, if it has been determined that the first communication terminal is enabled to participate, by means of only the packet-switching network elements, in a communication link in which the second communication terminal is participating by means of the circuit-switching network elements, a message comprising the information that the first communication terminal supports that a packet-switched communication link and a circuit-switched communication link is enabled to exist in parallel between the first communication terminal and the second communication terminal.

16. A message generating arrangement of a communication system, comprising:

a determining means for determining whether a first communication terminal of the communication system is enabled to participate, by means of only packet-switching network elements of the communication system in an absence of circuit-switching network elements in the first communication terminal, in a communication link in which a second communication terminal of the communication system is participating by means of circuit-switching network elements of the communication system; and a message generating means for generating, if it has been determined that the first communication terminal is enabled to participate, by means of only the packet-switching network elements, in a communication link in which the second communication terminal is participating by means of the circuit-switching network elements, a message comprising the information that the first communication terminal supports that a packet-switched communication link and a circuit-switched communication link is enabled to exist in parallel between the first communication terminal and the second communication terminal.

\* \* \* \* \*